May 11, 1926.

O. C. SHAVER

EYESHIELD

Filed April 23, 1925

1,584,041

INVENTOR.
ORTON C. SHAVER
BY
ATTORNEY

Patented May 11, 1926.

1,584,041

UNITED STATES PATENT OFFICE.

ORTON C. SHAVER, OF DETROIT, MICHIGAN.

EYESHIELD.

Application filed April 23, 1925. Serial No. 25,246.

My invention relates to a new and useful improvement in an eye shield, adapted for use particularly by a person while driving an automobile, and has for its object the provision of an eye shield, constructed in a similar manner to an ordinary pair of eye glasses and adapted for protecting the eyes of the driver of the automobile from the glare of the headlights of approaching automobiles.

Another object of the invention is the provision in an eye shield of this class of a lens which is formed translucent and adapted to serve as an eye shield.

Another object of the invention is the provision of an eye shield of this class having a movably mounted lens, provided with a translucent portion and adapted for being turned in its supporting frame, the frame having a frictional locking means to prevent undue turning of the lens in the frame.

Other objects will appear hereinafter.

The invention consists in the combinations and arrangements of parts hereinafter described and claimed.

Figure 1:
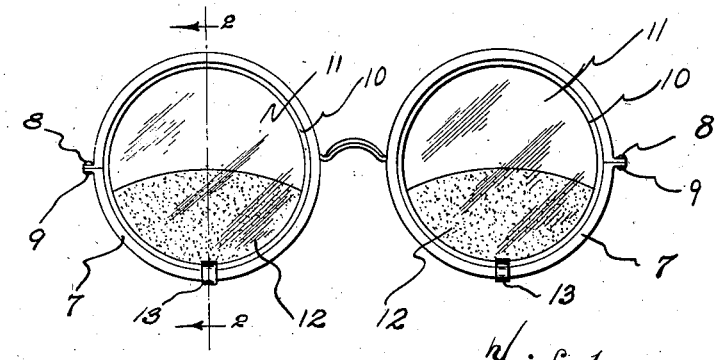
Figure 2:
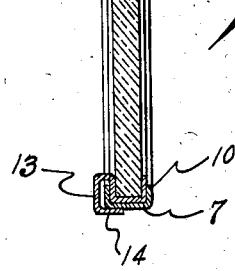
Figure 3:
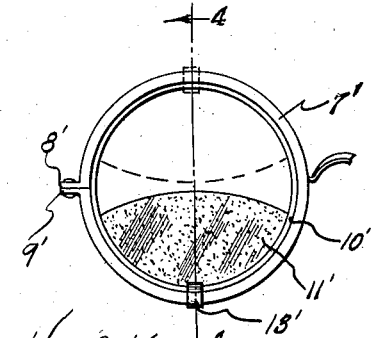
Figure 4:
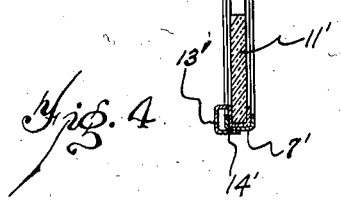

The invention will be best understood from a reference to the accompanying drawings, which form a part of this specification and in which, Fig. 1 is a front elevational view of the invention, Fig. 2 is a sectional view, taken on substantially line 2—2 of Fig. 1, Fig. 3 is a front elevational view of a modified form of the invention, Fig. 4 is a sectional view taken on substantially line 4—4 of Fig. 3.

As shown in the drawings, a pair of split frames 7 are connected together in the usual manner of the frames of eye glasses. These frames 7 have angularly turned portions 8 and 9 at one side, so that the ends may be separated for inserting an uninterrupted or non-split channel bearing frame 10 in the channels of the frames 7. Fixedly mounted in the channel bearing non-split frame 10 is a lens 11 having one portion 12 thereof rendered translucent, the remainder of the lens being transparent. Projecting outwardly from the frame 10, at one side thereof, is an angularly turned tongue 13 having the angularly turned portion 14 adapted for engaging the periphery of the frame 7. This portion 13 serves as a handhold for turning the lens 11 in the frame 7, the overlapping angularly turned, peripherally engaging portion 14 being held normally in close engagement with the periphery of the frame 7, to prevent undue turning of the lens 11 in the frame 7. When it is desired to turn the lens 11, so that the member 13 is to pass the angularly turned portions 8 and 9, the member 13 may be sprung outwardly against the resiliency of the material from which it is made, it being desirable that the frame 10 be made from a suitable metal, so that the portions 13 and 14 will possess the desired resiliency to maintain the portion 14 in close engagement with the periphery of the frame 7, and at the same time permit the outward swinging, so as to clear the angularly turned portions 8 and 9.

With a pair of eye glasses constructed in this manner, the driver of a vehicle, when approaching another vehicle, may peer through the translucent portions 12, which may be colored any desired color, so as to filter the rays of light. When driving, under normal conditions, the driver may look through the transparent portion of the lens 11.

When driving the vehicle in the day time, the translucent portions 12 may be turned so as to shield the eyes of the driver from the rays of the sun.

In the use of such a device, the driver of the vehicle may be opposed to looking through a lens under normal conditions and for this reason, I have provided the modified form shown in Figs. 3 and 4, in which the lens 11' covers only a portion of the area outlined by the frame 7' in which the frame 10' is positioned. The angularly turned portions 13' and 14' are present for performing the functions already described for the portions 13 and 14. The features shown in Figs. 3 and 4 may be used in the same manner, and for the same purposes as has already been mentioned concerning the forms shown in Figs. 1 and 2.

While I have illustrated and described the preferred form of structure, I do not wish to limit myself to the precise form of structure shown, but desire to avail myself of such variations and modifications as come within the scope of the appended claims.

Having thus described my invention, what I claim as new and desire to secure by Letters Patent is:

1. An eye shield of the class described, comprising a split channel bearing frame and a non-split channel bearing frame, adapted for positioning in said split channel bearing frame and movable therein; a lens mounted in said non-split frame having a translucent area; and a tongue projecting outwardly from said non-split frame for providing a hand hold for effecting the movement of said non-split frame in said split frame; and a portion on said tongue for normally resisting relative movement of said frames.

2. An eye shield of the class described, comprising a split channel bearing frame; a non-split channel bearing frame, movably mounted in said split frame; a member mounted in said non-split frame having a translucent area; a tongue projecting outwardly from said non-split frame and curved around said split frame and adapted for engaging the periphery of said split frame for normally resisting relative movement of said frames.

3. An eye shield of the class described, comprising a split channel bearing frame; a non-split channel bearing frame movably mounted in said split frame; a lens having a translucent area mounted in said non-split frame; a tongue projecting outwardly from said non-split frame adapted for affording a gripping member for effecting a turning of said non-split frame in said split frame and for normally preventing undue movement of said non-split frame in said split frame.

In testimony whereof, I have signed the foregoing specification.

ORTON C. SHAVER.